United States Patent
Sugimoto et al.

(10) Patent No.: US 10,160,351 B2
(45) Date of Patent: Dec. 25, 2018

(54) SEAT SLIDING APPARATUS FOR VEHICLE

(71) Applicant: AISIN SEIKI KABUSHIKI KAISHA, Kariya-shi (JP)

(72) Inventors: Masaki Sugimoto, Chiryu (JP); Makoto Sakai, Anjo (JP); Naoaki Hoshihara, Nagoya (JP); Yasuhiro Kojima, Kariya (JP); Satoshi Kimura, Toyota (JP)

(73) Assignee: AISIN SEIKI KABUSHIKI KAISHA, Kariya-shi (JP)

(*) Notice: Subject to any disclaimer, the term of this patent is extended or adjusted under 35 U.S.C. 154(b) by 0 days.

(21) Appl. No.: 15/754,844

(22) PCT Filed: Aug. 4, 2016

(86) PCT No.: PCT/JP2016/072928
§ 371 (c)(1),
(2) Date: Feb. 23, 2018

(87) PCT Pub. No.: WO2017/038370
PCT Pub. Date: Mar. 9, 2017

(65) Prior Publication Data
US 2018/0251046 A1 Sep. 6, 2018

(30) Foreign Application Priority Data
Aug. 28, 2015 (JP) ................. 2015-169585

(51) Int. Cl.
*B60N 2/00* (2006.01)
*B60N 2/08* (2006.01)
*B60N 2/07* (2006.01)

(52) U.S. Cl.
CPC .......... *B60N 2/085* (2013.01); *B60N 2/0818* (2013.01); *B60N 2/0705* (2013.01)

(58) Field of Classification Search
CPC .......... B60N 2/0715; B60N 2/06; B60N 2/08; B60N 2/07; B60N 2/0727
(Continued)

(56) References Cited

U.S. PATENT DOCUMENTS

2002/0060281 A1* 5/2002 Okazaki ............... B60N 2/0705
248/424
2006/0214477 A1 9/2006 Fukada et al.
(Continued)

FOREIGN PATENT DOCUMENTS

JP 2009-40185 A 2/2009
JP 2010-52528 A 3/2010

OTHER PUBLICATIONS

International Preliminary Report on Patentability and Written Opinion dated Mar. 6, 2018 in PCT/JP2016/072928 (English Translation only).

(Continued)

*Primary Examiner* — Steven M Marsh
(74) *Attorney, Agent, or Firm* — Oblon, McClelland, Maier & Neustadt, L.L.P.

(57) ABSTRACT

A vehicle seat sliding apparatus includes a lower rail, an upper rail, a slide-lock mechanism that pivots the lock member to a slide-lock position and holds the upper rail in a slide-lock state, and a slide-lock cancellation unit moved by operation of an operation member in a longitudinal direction of the upper rail to cancel an action of the slide-lock mechanism. The slide-lock cancellation unit includes a drive unit and an inclined surface arranged in the drive unit. The drive unit is supported by the upper rail so as to be slidable in the longitudinal direction of the upper rail. Operation of the operation member slides the drive unit. The inclined surface pivots the lock member to a slide-lock cancellation position when sliding.

5 Claims, 4 Drawing Sheets

(58) Field of Classification Search
USPC .............................................. 248/424, 429
See application file for complete search history.

(56) References Cited

U.S. PATENT DOCUMENTS

| | | | |
|---|---|---|---|
| 2007/0052273 A1 | 3/2007 | Satta et al. | |
| 2011/0163217 A1* | 7/2011 | Kimura ................ | B60N 2/0705 248/429 |
| 2012/0318948 A1* | 12/2012 | Yamada ............... | B60N 2/0727 248/429 |
| 2014/0353454 A1* | 12/2014 | Yamada ............... | B60N 2/0705 248/430 |
| 2015/0291062 A1* | 10/2015 | Yamada ............... | B60N 2/0705 384/47 |
| 2015/0306981 A1* | 10/2015 | Arakawa et al. .... | B60N 2/0705 248/429 |
| 2017/0008425 A1* | 1/2017 | Nagura ................ | B60N 2/0705 |

OTHER PUBLICATIONS

International Search Report dated Nov. 1, 2016, in PCT/JP2016/072928 filed Aug. 4, 2016.

* cited by examiner

SEAT SLIDING APPARATUS FOR VEHICLE

TECHNICAL FIELD

The present invention relates to a vehicle seat sliding apparatus that supports a vehicle seat so as to be slidable in a front-to-rear direction.

BACKGROUND ART

A vehicle seat sliding apparatus includes a slide-lock mechanism that supports a vehicle seat on a floor to allow for sliding in a front-to-rear direction and holds the vehicle seat to restrict sliding at a desired position.

One type of such a vehicle seat sliding apparatus includes an operation member, such as an operation lever arranged on a seat back, operated to actuate a lock cancellation link with a cable in order to cancel the action of the slide-lock mechanism and allow the vehicle seat to slide to the desired position.

Patent document 1 discloses a walk-in device that cancels the action of a slide-lock mechanism by actuating a link with a cable.

PRIOR ART DOCUMENT

Patent Document

Patent Document 1: Japanese Laid-Open Patent Publication No. 2010-52528

SUMMARY OF THE INVENTION

Problems that are to be Solved by the Invention

The walk-in device disclosed in patent document 1 cancels the action of the slide-lock mechanism when a pulling force of the cable pivots a memory cancellation link, and the pivoting of the memory cancellation link pivots a slide-lock cancellation link.

Such a structure pivots the memory cancellation link and the slide-lock cancellation link about a pivot axis along a vertical plane and thus increases the height of a link mechanism. As a result, a cover that accommodates the link mechanism may abut against a lower surface of a seat cushion. This may lower the seating comfort.

Further, when shortening the distance between the center of pivot and the point of application of the link mechanism in order to reduce the height of the link mechanism, the operation force needed to pull the cable increases.

It is an object of the present invention to provide a vehicle seat sliding apparatus that reduces the height of a slide-lock cancellation mechanism that cancels the action of a slide-lock mechanism without lowering the operability.

Means for Solving the Problem

A vehicle seat sliding apparatus that solves the above problem includes a lower rail, an upper rail, a slide-lock mechanism, and a slide-lock cancellation unit. The lower rail is configured to be fixed to a floor of a vehicle. The upper rail is configured to be supported by the lower rail in a slidable manner. A seat cushion is coupled to the upper rail. The slide-lock mechanism is located between the lower rail and the upper rail. The slide-lock mechanism includes a spring member and a lock member. The slide-lock mechanism pivots the lock member with a biasing force of the spring member to a slide-lock position and holds the upper rail in a slide-lock state. The slide-lock cancellation unit is moved by operation of an operation member in a longitudinal direction of the upper rail to cancel an action of the slide-lock mechanism. The slide-lock cancellation unit includes a drive unit supported by the upper rail so as to be slidable in the longitudinal direction of the upper rail. Operation of the operation member slides the drive unit. The slide-lock cancellation unit includes a wedge arranged in the drive unit. The wedge includes an inclined surface that pivots the lock member to a slide-lock cancellation position when sliding.

EMBODIMENTS OF THE INVENTION

One embodiment of a vehicle seat sliding apparatus will now be described with reference to the drawings. In the seat sliding apparatus, two seat rails extend in parallel on a floor of a vehicle and support a seat cushion so that the seat cushion is slidable in a front-to-rear direction.

Two seat rails 1 each include a slide-lock mechanism 4 and a slide-lock cancellation unit 5.

Figure 1:
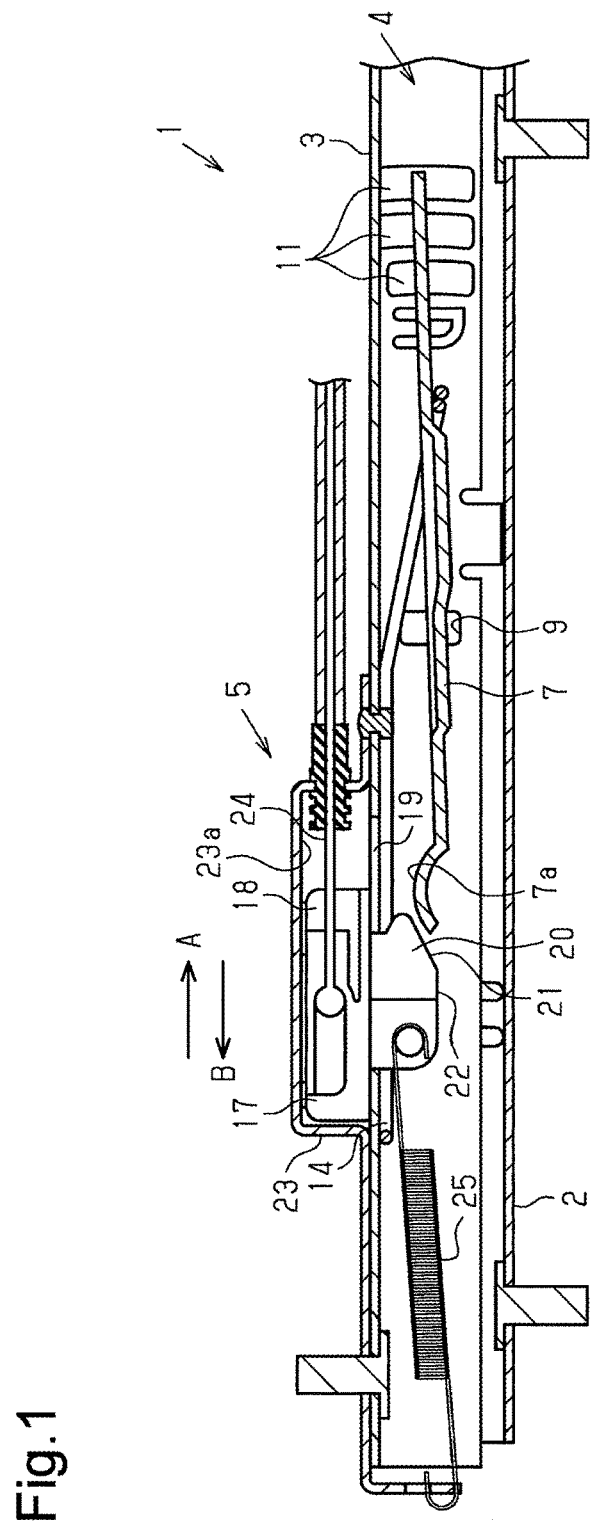
FIG. 1 is a cross-sectional view showing a vehicle seat sliding apparatus.
Figure 2:
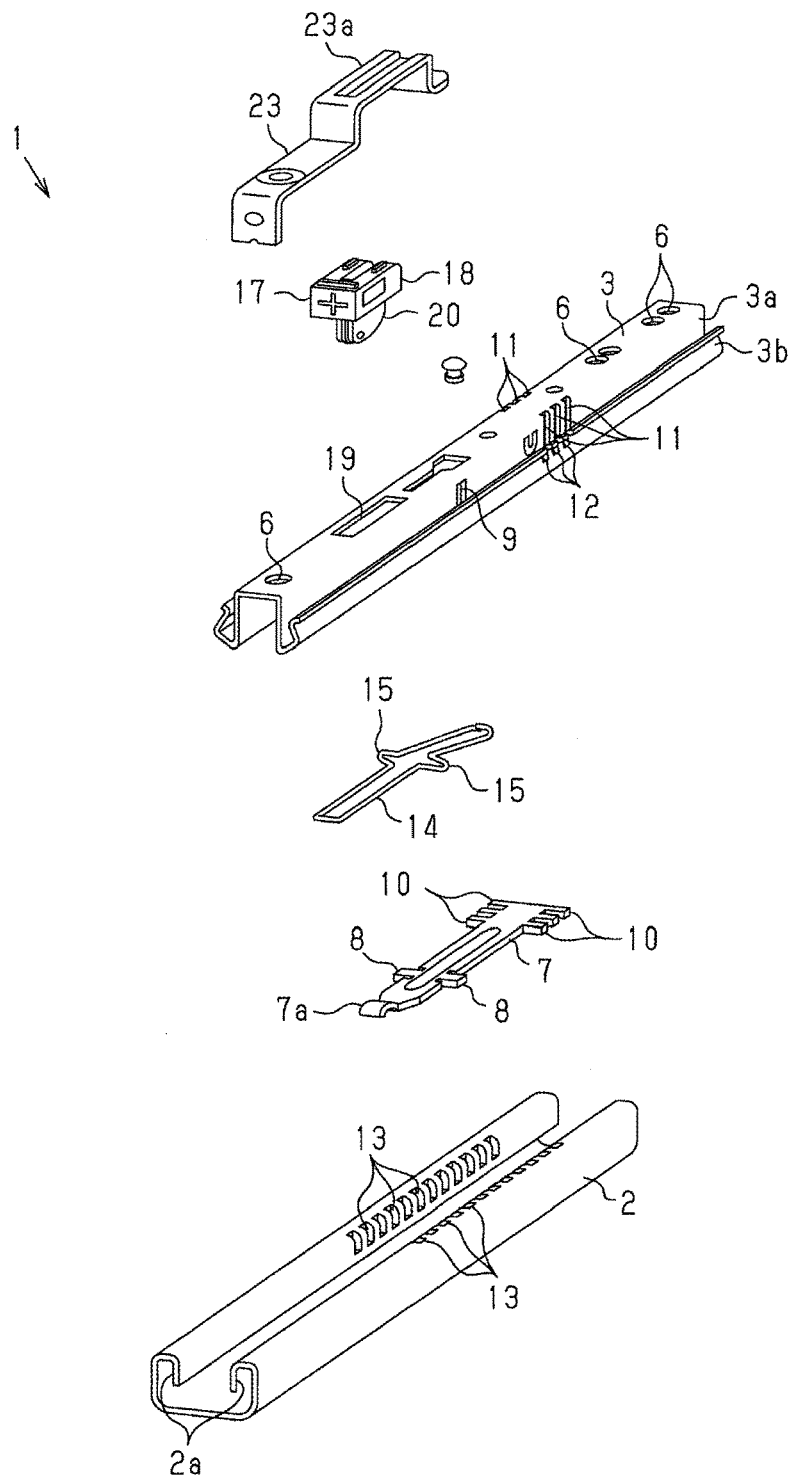
FIG. 2 is an exploded perspective view showing the vehicle seat sliding apparatus.

More specifically, as shown in FIGS. 1 and 2, each of the seat rails 1 includes a lower rail 2 configured to be fixed to the floor, an upper rail 3 supported by the lower rail 2 in a slidable manner, the slide-lock mechanism 4, and the slide-lock cancellation unit 5.

The lower rail 2 has the form of a groove that opens upwardly at a middle portion in a widthwise direction. Guide pieces 2a downwardly extend toward opposite sides in the widthwise direction from the open portion of the lower rail 2.

The upper rail 3 is supported by the lower rail 2 so as to be slidable in a longitudinal direction of the lower rail 2. The upper rail 3 includes a groove 3a that opens downwardly and guide pieces 3b that are bent outward from the two widthwise sides of the lower edge of the groove 3a and then upwardly extended.

The upper rail 3 is fitted so that the guide pieces 2a of the lower rail 2 are located between the groove 3a and the guide pieces 3b. The upper rail 3 is supported by rolling members (not shown), which are located between the guide pieces 3b and the inner surface of the lower rail 2, so as to be slidable relative to the lower rail 2.

As shown in FIG. 2, the upper wall of the groove 3a of the upper rail 3 includes a plurality of coupling holes 6. A seat cushion frame is fixed to the two upper rails 3 through the coupling holes 6. Thus, the vehicle seat, which includes a seat cushion and a seat back, is supported by the upper rails 3 so as to be slidable on the lower rails 2.

A main portion of the slide-lock mechanism 4 and the slide-lock cancellation unit 5 are arranged in the upper rail 3. More specifically, a lock member 7 formed by an elongated metal plate is arranged in the upper rail 3 in the longitudinal direction of the upper rail 3.

The lock member 7 includes shafts 8 projecting toward opposite sides in the widthwise direction from a longitudinally middle portion of the lock member 7. Support holes 9 in the side walls of the groove 3a of the upper rail 3 support the shafts 8 so that the shafts 8 are pivotal and vertically movable.

Thus, front and rear ends of the lock member 7 are pivotal about the shafts 8 in the vertical direction in a seesaw manner.

Three pairs of engagement tabs 10 project toward opposite sides in the widthwise direction from a distal portion of the lock member 7. Three engagement holes 11 extend in the vertical direction through each of the two side walls of the groove 3a of the upper rail 3 at positions corresponding to the engagement tabs 10. The engagement tabs 10 are allowed to vertically move in the engagement holes 11 when the lock member 7 pivots.

Further, the guide pieces 3b of the upper rail 3 includes fitting grooves 12 that open upwardly at positions corresponding to the engagement tabs 10. As shown in FIG. 1, when the lock member 7 is positioned in the upper rail 3 in a substantially horizontal state, distal ends of the engagement tabs 10 extend through the engagement holes 11 and project into the fitting grooves 12.

The guide pieces 2a of the lower rail 2 each include a large number of lock holes 13 that open upwardly. The lock holes 13 are arranged at equal intervals in the longitudinal direction of the lower rail 2. The intervals of the lock holes 13 are the same as the intervals of the engagement holes 11 and the fitting grooves 12, and the engagement tabs 10 can be fitted from above into any of three successive ones of the lock holes 13.

As shown in FIG. 1, when the lock member 7 is positioned in a substantially horizontal state in the upper rail 3, the distal ends of the engagement tabs 10 extend through the engagement holes 11 and the lock holes 13. In this state, the engagement tabs 10 extend through the engagement holes 11 and the lock holes 13 and reach the inside of the fitting grooves 12. Thus, the upper rail 3 is held so as to restrict sliding of the upper rail 3 relative to the lower rail 2.

Figure 3:
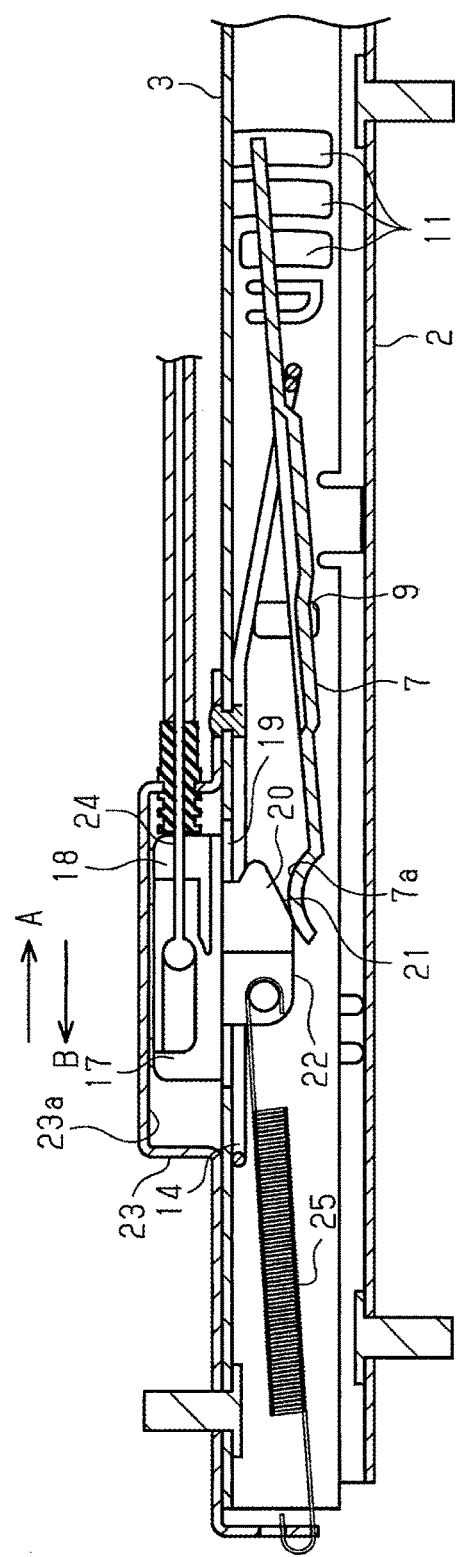
FIG. 3 is a cross-sectional view showing movement of the vehicle seat sliding apparatus.

Further, as shown in FIG. 3, when the distal portion of the lock member 7 is pivoted upwardly, the engagement tabs 10 are separated from the lock holes 13. This allows the upper rail 3 to slide relative to the lower rail 2.

The basal portion of the lock member 7 includes a contact portion 7a serving as a convex surface bulged upwardly.

A spring member 14 is arranged between the lock member 7 and the upper wall of the groove 3a of the upper rail 3. The spring member 14 is formed by bending an elastic metal wire into a rectangular shape. The two sides of a longitudinally middle portion of the spring member 14 are bent outward to form engagement portions 15.

Further, the spring member 14 is bent at an obtuse angle at the engagement portions 15 that serve as a boundary so as to be V-shaped from the basal side toward the distal side. The engagement portions 15 are supported by the support holes 9 with the basal portion of the spring member 14 abutting against the lower surface of the upper wall of the upper rail 3.

The distal portion of the spring member 14 is engaged with the vicinity of the engagement tabs 10 at the distal side of the lock member 7. When the distal side of the lock member 7 is upwardly pivoted, the distal end of the spring member 14 upwardly pivots. Thus, the spring member 14 accumulates a biasing force and downwardly biases the distal side of the lock member 7.

A drive unit 17 located above the basal portion of the lock member 7 in the upper wall of the groove 3a of the upper rail 3 downwardly presses and pivots the basal portion of the lock member 7. The drive unit 17 is supported so as to be slidable in the longitudinal direction of the upper rail 3.

The drive unit 17 is formed from a synthetic resin. The drive unit 17 includes a body 18 that is supported so as to be slidable on the upper wall of the upper rail 3 and a wedge 20 that projects into the upper rail 3 from a guide hole 19 formed in the upper wall of the upper rail 3. The guide hole 19 is rectangular and extends in the longitudinal direction of the upper rail 3. The drive unit 17 is slidable relative to the upper rail 3 within a range in which the wedge 20 is movable in the guide hole 19.

The wedge 20 includes an inclined surface 21 of which thickness decreases toward the contact portion 7a of the lock member 7 to be wedge-shaped. A horizontal surface 22 is continuous with the inclined surface 21. When the drive unit 17 slides toward the lock member 7 in the direction of arrow A indicated in FIG. 1, the inclined surface 21 of the wedge 20 abuts against the contact portion 7a. This downwardly pushes the basal portion of the lock member 7.

A cover 23 that covers the upper side of the drive unit 17 is coupled to the upper wall of the groove 3a of the upper rail 3. The body 18 of the drive unit 17 is supported so as to be slidable between the cover 23 and the upper rail 3. When the wedge 20 presses the contact portion 7a, its reaction force is received by an upper wall 23a of the cover 23 so that the body 18 slides relative to the upper wall 23a.

One end of a cable 24 is connected to the body 18 of the drive unit 17. The cable 24 extends through the cover 23, and the other end of the cable 24 is connected to an operation member such as an operation lever. When the operation member is operated to pull the cable 24 in the direction of arrow A, the drive unit 17 slides in the same direction.

One end of the cover 23 is bent downwardly to cover the edge of the groove 3a at the front end of the upper rail 3. A coil spring 25 connects the end of the cover 23 to the wedge 20, and the biasing force of the coil spring 25 constantly biases the drive unit 17 in the direction of arrow B.

Thus, when a pulling force in the direction of arrow A does not act on the cable 24, the wedge 20 of the drive unit 17 is moved to where the wedge 20 abuts against the end of the guide hole 19 that is proximate to the coil spring 25.

In this state, a slight gap extends between the inclined surface 21 and the contact portion 7a as shown in FIG. 1, and a downward pressing force does not act on the contact portion 7a.

The operation of the seat sliding apparatus will now be described.

When a pulling force in the direction of arrow A does not act on the cable 24, a slight gap extends between the inclined surface 21 of the wedge 20 and the contact portion 7a and a downward pressing force does not act on the contact portion 7a.

In this state, as shown in FIG. 1, the biasing force of the spring member 14 positions the lock member 7 in the substantially horizontal direction and engages the engagement tabs 10 with the lock holes 13. As a result, the upper rail 3 is held so that sliding of the upper rail 3 is restricted relative to the lower rail 2.

From this state, when operation of the operation member such as the operation lever (not shown) pulls the cable 24 in the direction of arrow A, the drive unit 17 slides in the same direction and the inclined surface 21 of the wedge 20 downwardly presses the contact portion 7a. Thus, as shown in FIG. 3, the basal portion of the lock member 7 is downwardly pivoted.

As a result, the upper end of the lock member 7 is upwardly pivoted, and the engagement tabs 10 are disengaged from the lock holes 13. This allows the upper rail 3 to slide relative to the lower rail 2 so that the seat cushion can slide to a desired position in the front-to-rear direction.

Figure 4:
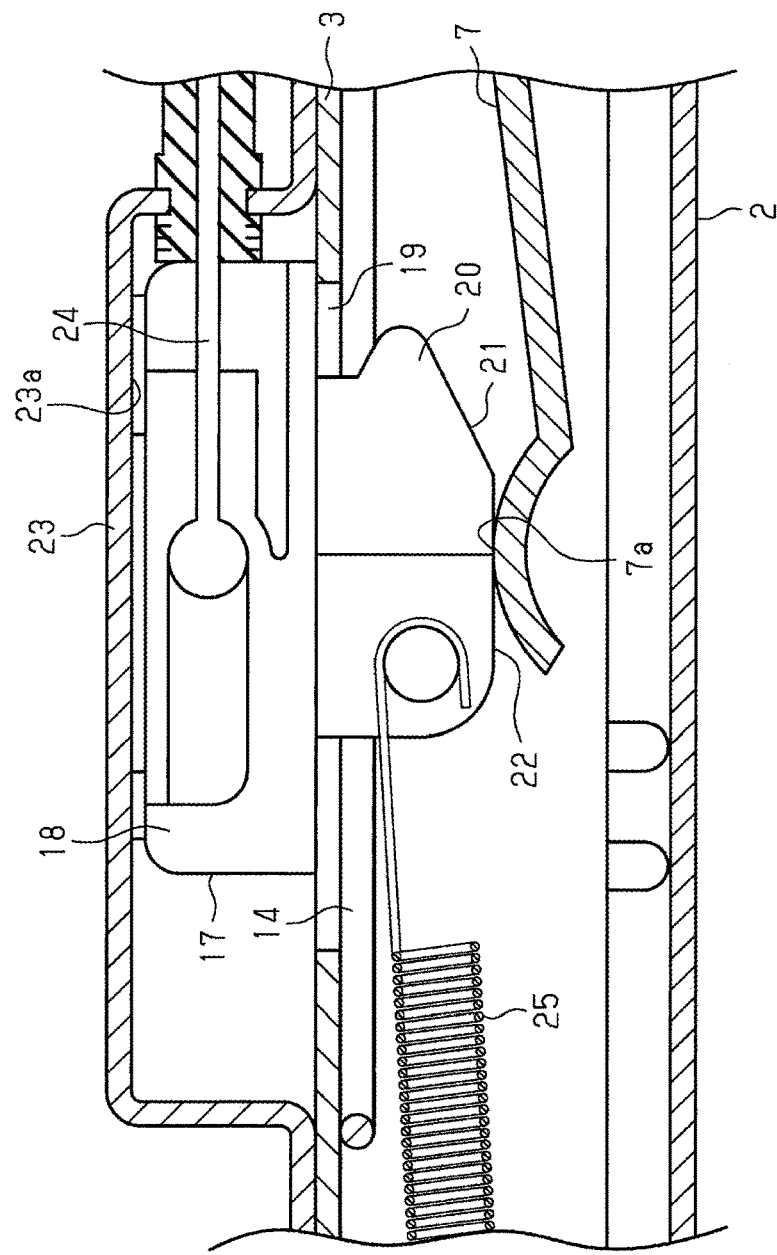
FIG. 4 is a cross-sectional view showing movement of the vehicle seat sliding apparatus.

As shown in FIG. 4, when the cable 24 is further pulled in the same direction after the contact portion 7a reaches the lower edge of the inclined surface 21, the horizontal surface 22, which is continuous with the inclined surface 21, continues to downwardly press the contact portion 7a. This keeps the upper rail 3 slidable relative to the lower rail 2.

When the operation of the operation lever is cancelled after sliding the seat cushion to the desired position, the biasing force of the coil spring 25 slides the drive unit 17 in the direction of arrow B. This stops pressing the contact portion 7a with the wedge 20, and the biasing force of the spring member 14 returns the lock member 7 to the state shown in FIG. 1. As a result, sliding of the upper rail 3 is restricted relative to the lower rail 2. This fixes the seat cushion at the desired position.

The seat sliding apparatus has the advantages described below.

(1) The lock member 7 is pivoted by the drive unit 17 that slides when the cable 24 is pulled. This allows the upper rail 3 to slide relative to the lower rail 2.

(2) The sliding of the drive unit 17 slides the wedge 20 toward the lock member 7, and the inclined surface 21 of the wedge 20 downwardly pushes the contact portion 7a of the lock member 7. This pivots the lock member 7 and cancels the slide-lock state. Thus, there is no need for a link mechanism that is pivoted by pulling a cable. This reduces the height of the lock cancellation mechanism including the drive unit 17 and the lock member 7.

(3) The drive unit 17 receives only the pulling force that is generated by the cable 24 and the coil spring 25 and the compressing force that is generated between the contact portion 7a and the cover member 23 as a reaction force pressing the contact portion 7a. This ensures sufficient mechanical strength even though the drive unit 17 is formed from a synthetic resin.

(4) The drive unit 17 is formed from a synthetic resin. This limits the generation of noise when sliding the contact portion 7a relative to the inclined surface 21 and reduces the sliding resistance of the contact portion 7a and the inclined surface 21.

(5) The angle of the inclined surface 21 can be suitably set to allow for easy adjustment of the operation force that pivots the lock member 7 and cancels the slide-lock state and a cancellation stroke of the cable 24 required to cancel the slide-lock state.

(6) The wedge 20 of the drive unit 17 includes the horizontal surface 22 that is continuous with the inclined surface 21. Thus, even if a large cancellation stroke of the cable 24 is set, the slide-lock is cancelled without any problem. Accordingly, the present embodiment easily copes with seat sliding apparatuses having different specifications with respect to the cancellation stroke of the cable 24.

(7) The slide-lock cancellation unit 5 is formed by the drive unit 17, the cover 23, and the coil spring 25. This reduces the number of components of the slide-lock cancellation unit as compared to known examples.

The above embodiment may be modified as described below.

The drive unit including the wedge may be slidable outside the upper rail and the lower rail, and the wedge may pivot the lock member.

The drive unit 17 may be moved by an operation member such as an operation lever.

The invention claimed is:

1. A vehicle seat sliding apparatus comprising:
a lower rail configured to be fixed to a floor of a vehicle;
an upper rail configured to be supported by the lower rail in a slidable manner, wherein a seat cushion is configured to be coupled to the upper rail;
a slide-lock mechanism located between the lower rail and the upper rail, wherein the slide-lock mechanism includes a spring member and a lock member, and the slide-lock mechanism pivots the lock member with a biasing force of the spring member to a slide-lock position and holds the upper rail in a slide-lock state; and
a slide-lock cancellation unit moved by operation of an operation member in a longitudinal direction of the upper rail to cancel an action of the slide-lock mechanism,
wherein the slide-lock cancellation unit includes
a drive unit supported by the upper rail so as to be slidable in the longitudinal direction of the upper rail based on operation of the operation member, and
a wedge arranged in the drive unit, wherein the wedge includes an inclined surface that pivots the lock member to a slide-lock cancellation position when sliding.

2. The vehicle seat sliding apparatus according to claim 1, further comprising a cover member coupled to the upper rail, wherein
the cover member holds an upper surface of the drive unit in a slidable manner, and
the inclined surface downwardly presses and pivots a basal portion of the lock member when the drive unit slides.

3. The vehicle seat sliding apparatus according to claim 2, wherein the drive unit including the wedge is formed from a synthetic resin.

4. The vehicle seat sliding apparatus according to claim 3, wherein the wedge includes a horizontal surface that is continuous with the inclined surface.

5. The vehicle seat sliding apparatus according to claim 1, further comprising a biasing member located between the drive unit and the upper rail,
wherein the biasing member is configured to move the wedge so that the lock member returns to a slide-lock position when pulling of a cable is cancelled.

* * * * *